US009927042B2

(12) United States Patent
Brown et al.

(10) Patent No.: US 9,927,042 B2
(45) Date of Patent: *Mar. 27, 2018

(54) MULTIFUNCTIONAL RESTRICTIVE VALVE

(71) Applicants: Michael Brown, Phoenix, AZ (US);
John Lockhart, Ridgway, CO (US);
Jeffrey S. Doss, Scottsdale, AZ (US)

(72) Inventors: Michael Brown, Phoenix, AZ (US);
John Lockhart, Ridgway, CO (US);
Jeffrey S. Doss, Scottsdale, AZ (US)

(73) Assignee: Evolve Technologies, LLC, Scottsdale, AZ (US)

(*) Notice: Subject to any disclaimer, the term of this patent is extended or adjusted under 35 U.S.C. 154(b) by 0 days.

This patent is subject to a terminal disclaimer.

(21) Appl. No.: 15/478,065

(22) Filed: Apr. 3, 2017

(65) Prior Publication Data

US 2017/0219113 A1  Aug. 3, 2017

Related U.S. Application Data

(63) Continuation of application No. 15/082,950, filed on Mar. 28, 2016, now Pat. No. 9,611,629, which is a continuation of application No. 13/857,705, filed on Apr. 5, 2013, now Pat. No. 9,309,655, which is a continuation of application No. 12/966,471, filed on
(Continued)

(51) Int. Cl.
*E03C 1/04* (2006.01)
*E03C 1/044* (2006.01)
*F16K 1/12* (2006.01)
*F16K 31/00* (2006.01)
(Continued)

(52) U.S. Cl.
CPC .............. *F16K 31/002* (2013.01); *E03C 1/04* (2013.01); *E03C 1/044* (2013.01); *E03C 1/0408* (2013.01); *F16K 1/123* (2013.01); *F16K 3/24* (2013.01); *G05D 23/022* (2013.01); *E03C 2001/0418* (2013.01); *Y10T 137/7737* (2015.04)

(58) Field of Classification Search
CPC ........ F16K 31/002; F16K 3/24; E03C 1/0408; E03C 2001/0418; E03C 1/04; G05D 23/022; G05D 23/02; G05D 23/13
USPC ........................... 236/93 A, 93 B, 99 K, 100
See application file for complete search history.

(56) References Cited

U.S. PATENT DOCUMENTS 4,431,020 A   2/1984   Kowalski
4,460,007 A   7/1984   Pirkle
(Continued)

*Primary Examiner* — Mohammad M Ali
(74) *Attorney, Agent, or Firm* — Culhane Meadows PLLC; Robert C. Klinger

(57) ABSTRACT

A multifunctional restrictive valve for controlling the flow of water therethrough. The valve has a main body with a flow channel through the main body. The main body receives water upstream thereof through an inlet port and passes it out through an outlet port at the downstream end of the body. A flow control assembly is located in the flow channel and includes a temperature sensor/actuator acting on a piston to move, when the temperature sensor heats up the piston, to block water flow control ports. The flow control assembly also includes an override feature wherein the piston is located within a slide and the flow control ports are located in the slide. By moving the slide away from the piston when the piston is blocking the flow control ports, the temperature sensor and piston may be overridden and flow may resume through the main body.

1 Claim, 16 Drawing Sheets

Related U.S. Application Data

Dec. 13, 2010, now Pat. No. 8,434,693, which is a continuation of application No. 11/788,884, filed on Apr. 23, 2007, now Pat. No. 7,878,417, which is a continuation-in-part of application No. 11/154,404, filed on Jun. 15, 2005, now Pat. No. 7,681,804.

(60) Provisional application No. 60/794,735, filed on Apr. 25, 2006.

(51) Int. Cl.
*G05D 23/02* (2006.01)
*F16K 3/24* (2006.01)

(56) References Cited

U.S. PATENT DOCUMENTS

| | | | |
|---|---|---|---|
| 4,638,828 A | 1/1987 | Barrineau, Sr. | |
| 4,651,768 A | 3/1987 | Epe | |
| 4,878,512 A | 11/1989 | Pirkle | |
| 5,390,899 A | 2/1995 | Perez | |
| 5,595,216 A | 1/1997 | Pilolla | |
| 5,826,613 A | 10/1998 | Schalk | |
| 5,915,665 A | 6/1999 | Paese | |
| 6,230,734 B1 | 5/2001 | Grebnev | |
| 6,237,853 B1 | 5/2001 | Bergmann | |
| 6,286,764 B1 * | 9/2001 | Garvey | G05D 7/0635 236/12.12 |
| 6,325,092 B1 | 12/2001 | Pirkle | |
| 6,616,058 B1 | 9/2003 | Pirkle | |
| 2002/0062867 A1 | 5/2002 | Kempf | |

* cited by examiner

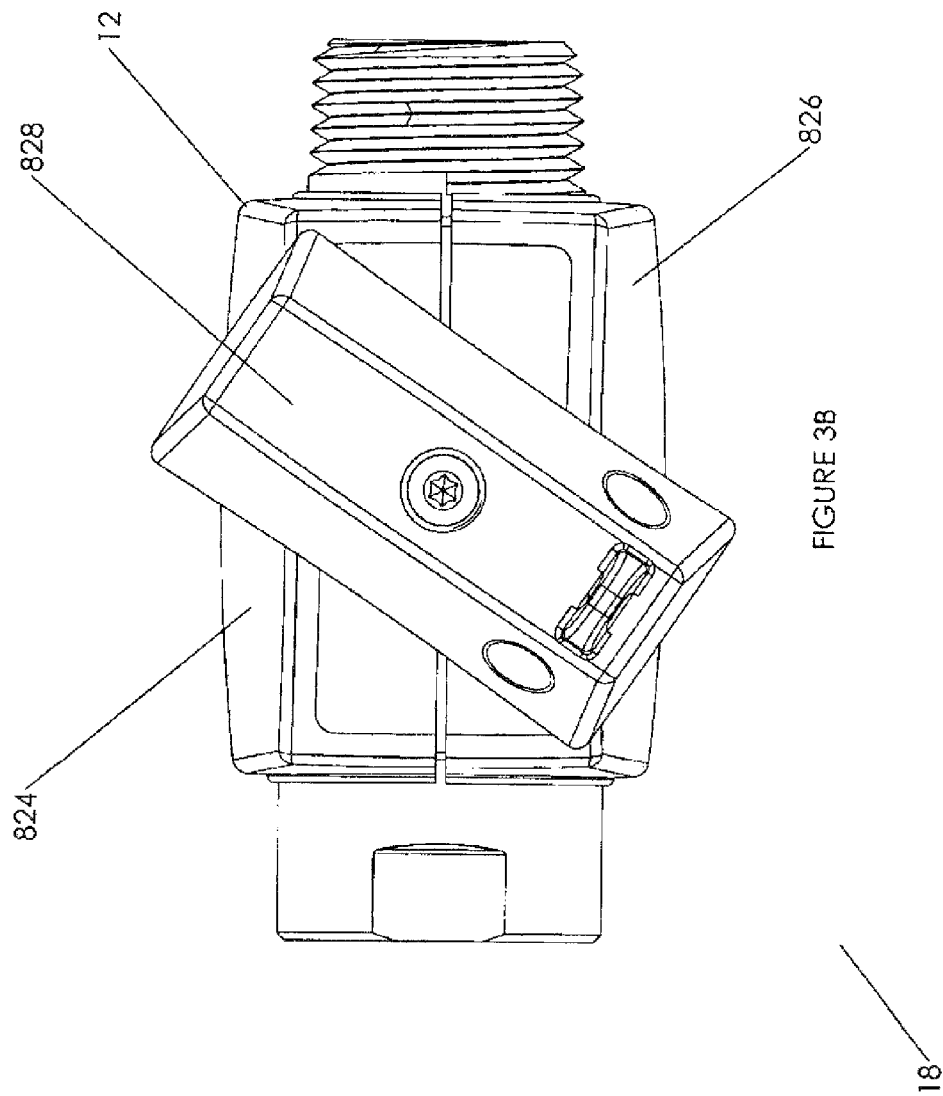

MULTIFUNCTIONAL RESTRICTIVE VALVE

PRIORITY CLAIM

This application is a Continuation of U.S. patent application Ser. No. 15/082,950, now U.S. Pat. No. 9,611,629, filed Mar. 28, 2016, which is a Continuation of U.S. patent application Ser. No. 13/857,705, filed Apr. 5, 2013, now U.S. Pat. No. 9,309,655, which is a Continuation of U.S. patent application Ser. No. 12/966,471, now U.S. Pat. No. 8,434,693, filed Dec. 13, 2010, which is a Continuation of U.S. patent application Ser. No. 11/788,884, now U.S. Pat. No. 7,878,417, filed Apr. 23, 2007, which is a Continuation-in-Part of U.S. patent application Ser. No. 11/154,404, now U.S. Pat. No. 7,681,804, filed Jun. 15, 2005.

FIELD OF THE INVENTION

The present invention is generally related to restrictive valves, and more specifically to controlled fluid flow restrictive valves with a temperature controlled cutoff port, including a resettable release mechanism for overriding the temperature controlled flow cutoff port.

BACKGROUND OF THE INVENTION

It is often necessary, in both consumer and commercial contexts, to wait for a water source to reach a suitable temperature prior to use. For example, it is very common for an individual to turn on the hot water in the shower, or at a sink, and then wait for an extended length of time until the water is at the correct temperature.

Additionally, vast amounts of water and energy are wasted each year due to the delay in receiving water at the correct temperature. That is, as most individuals are reluctant to stand by the shower and continuously monitor the water temperature for many minutes, a significant amount of hot water is simply lost down the drain. This increases both water costs as well as heating costs. Multiplied by the number of individuals that must engage in this practice on a daily basis, the waste is significant.

SUMMARY OF INVENTION

The present invention achieves technical advantages as a temperature controlled valve with manual and hydraulic control features. One embodiment of the invention utilizes: a piston adapted to restrict fluid flow through a channel as a function of fluid temperature. A paraffin wax sensor permits unimpeded fluid flow through the channel when the fluid temperature is below a first temperature, reduces fluid flow through the channel at a second fluid temperature, and again permits fluid flow through the channel when the fluid temperature falls below the first temperature. Advantageously, the temperature controlled valve has a release mechanism, typically manually controlled, adapted to permit fluid flow through the channel independent of the fluid temperature. The release mechanism may be automatically reset as, for example, by a drop in hydraulic pressure in the valve.

Applicant's novel valve monitors the temperature of the shower water as it warms up. Once the shower water is at an adequate temperature for showering, the valve pauses or restricts the flow of water in order to save hot water from going down the drain. When the user is ready for the shower, they reactivate the valve by flipping a lever. This lever bypasses or overrides the temperature activated shutoff mechanism and allows the shower to return to full flow without regard to temperature. Once the user has finished showering, they shut off the water in normal fashion (for example, at the mixing valve). The novel valve device detects the shower has been shut off through a drop in hydraulic pressure in the valve and automatically resets itself and arms the bypass for the next use.

Thus, the device is designed to conserve water and energy by reducing the amount of hot water wasted during the time the person first turns on the water and when they actually enter the shower (the warm-up period). Applicant's novel valve accomplishes this by restricting or stopping the water flow from the shower once the water has reached a suitable showering temperature. However, the user is allowed to resume the flow of water and actually ready to begin using it.

Applicant's valve achieves its novel functions and advantages through the use of a water temperature controlled mechanism, including a piston, temperature sensor and water flow ports (for example, in a slide), that provides for shutoff when water temperature reaches above a predetermined temperature to avoid wasting hot water. However, the user may manually engage an override which would allow warm water to flow through despite a high temperature condition. With the override engaged, water temperature may be adjusted to suit the user's preference and warm water, even above the temperature that shutoff the flow from the pre-override position, will continue to flow when the override is engaged or moved from a pre-override position to an engaged or override position. The override is typically activated by the manual unlatching and the user needs not hold or maintain force on the handle to keep the assembly in the override position. Moreover, Applicant's novel valve includes means to automatically reset the override to a disengaged or pre-override position wherein the reset is responsive to water pressure drop (as by mixing valve shutoff, for example).

BRIEF DESCRIPTION OF THE DRAWINGS

FIG. 3B is an external side elevational view of the valve assembly.

DETAILED DESCRIPTION OF THE PREFERRED EMBODIMENTS

Figure 1:
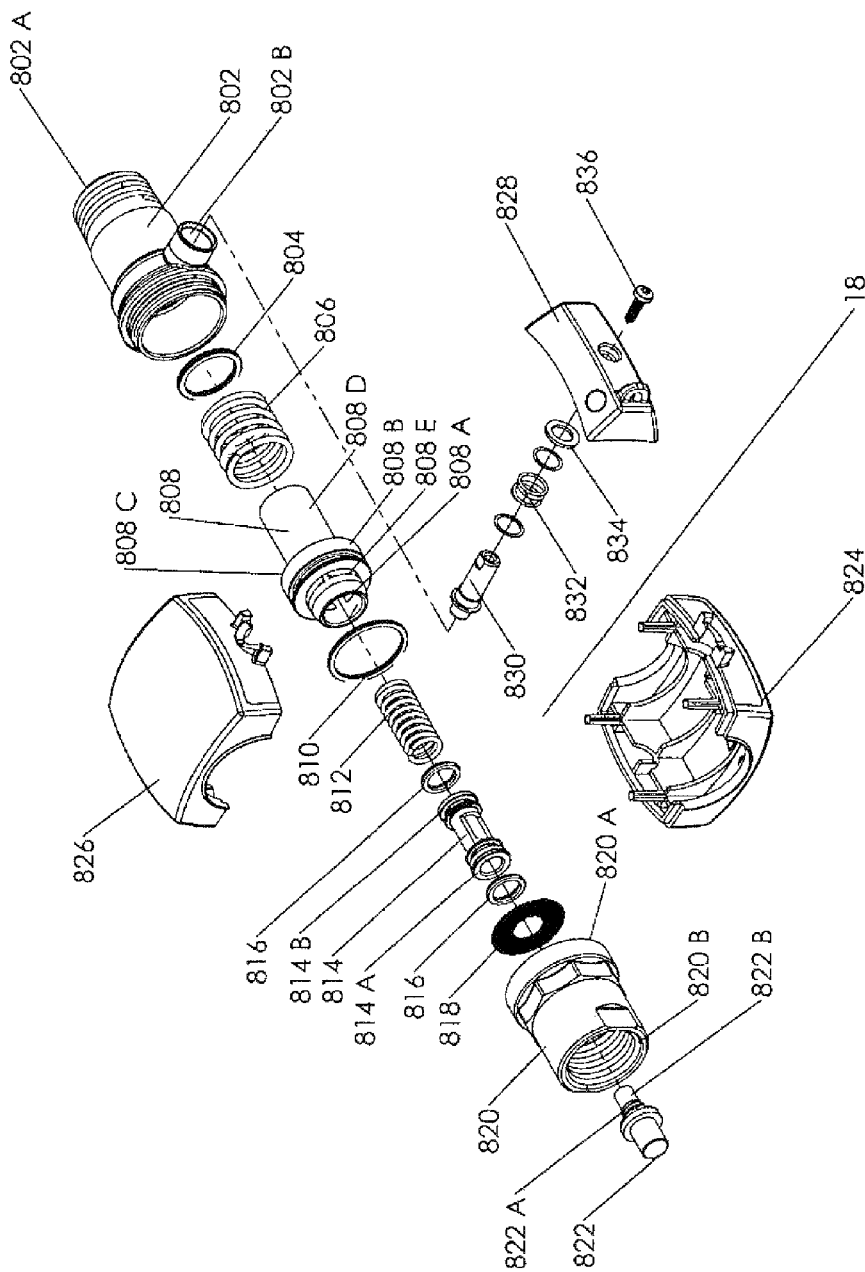
FIG. 1 is an exploded perspective view of the valve assembly.

Referring now to FIGS. 1-5B, there is shown an exploded view of a first embodiment of the present invention assembly. The valve assembly 18 is comprised of the following components: a main body rear 802, a main body O-ring 804, a slide spring 806, a slide 808, a slide O-ring 810, a piston spring 812, a piston 814, two piston O-rings 816, a screen 818, a body front 820, an actuator 822, a release pin 830, a release pin spring 832, and a pin retention ring 834. The valve assembly housing 12 is comprised of the following components: a housing first part 824, a housing second part 826, and a handle 828.

The main body O-ring 804, slide spring 806, and the longer end of the slide 808 are operably, inserted into the wider, threaded end of the body rear 802. The main body is comprised of body rear 802 and body front 820. The piston spring 812, a first piston O-ring 816, the piston 814, and a second piston O-ring 816 are operably inserted into the wider, threaded end of the body rear 802. The screen 818 and the slide O-ring 810 are operably inserted into the wider end of the body front 820. The wider, threaded end of the body rear 802 is operably coupled to the wider end of the body front 820 to enclose the aforementioned components. The temperature sensor and actuator 822 is operably inserted into the narrower end of the body front 820. The release pin 830 is operably inserted into body rear 802 with the release pin spring 832. The housing first part 824 and, the housing second part 826 are operably coupled to substantially enclose the valve assembly 18 and the handle 828 is operably coupled to the release pin 830. In one exemplary embodiment, a handle screw 836 is used to operably couple the handle 828 with release pin 830.

Body rear 802 further includes main body outlet port 802A, release pin housing 802B, spring retainer 802D, and stop lip 802C. Slide 808 further includes slide nose 808A, slide head 808B, slide head lower surface 808C, hollow slide body 808D, and slide ports 808E for controlling the flow of water through the valve assembly. Piston spring 812 is dimensioned for receipt into hollow slide body 808D and to abut at a front end piston base 814B and at a second end spring retainer 802D. Piston 814 includes piston head 814A, piston base 814B, piston stem 8140, and piston head cavity 814D. Piston head 814A includes a piston head cavity 814D for receipt of actuator nose 822B there into. Body front 820 includes body end shoulder 820A capable of receiving and stopping the motion of slide 808 as urged in an upstream direction by slide spring 806. Body front 820 also defines, at an upstream end, inlet port 820B. Body front 820 is seen to have threaded walls for threaded engagement with body rear 802. Actuator 822 is seen to have threaded walls 822A for threaded engagement with threaded walls 820C of body front 820. Actuator 822 also has actuator nose 822B shaped to fit snug within piston head cavity 814D as seen in FIG. 1A, for example. FIG. 1A also illustrates a channel 814E (see also FIGS. 5B and 5C) through piston head 814A, which will allow a small amount of water to flow through the valve even when in the shutoff position illustrated in FIG. 2A.

Figure 1A:
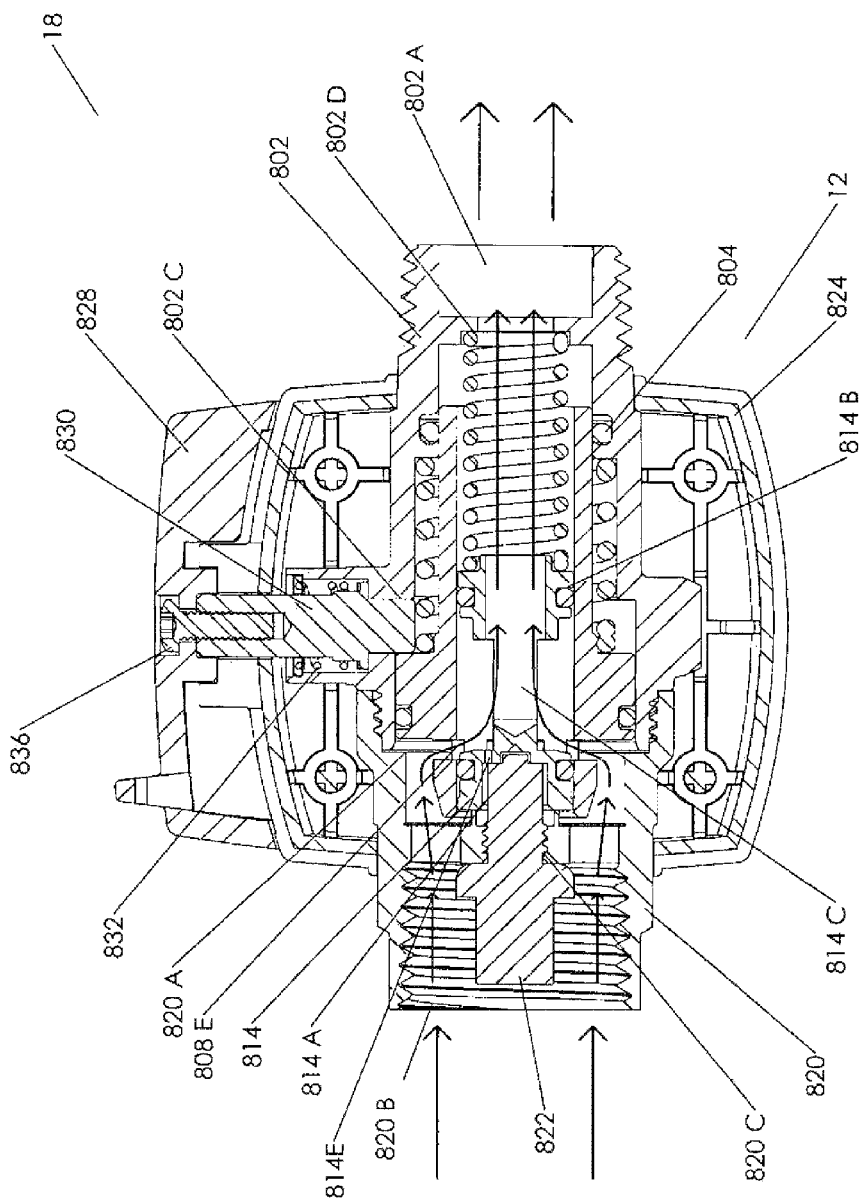
FIG. 1A is a top elevational view through a section of the valve assembly showing with arrows the water flow.
Figure 1B:
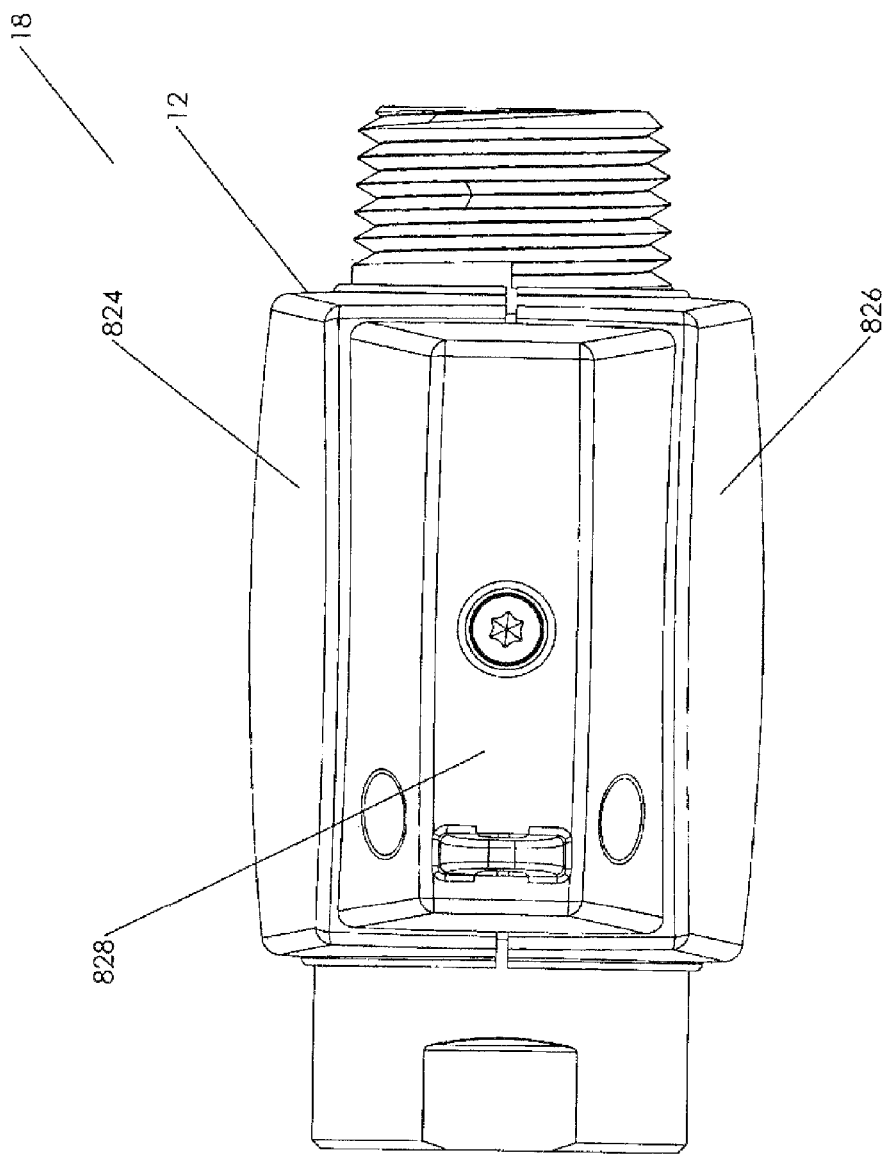
FIG. 1B is an external side elevational view of the valve assembly.

FIGS. 1, 1A, and 1B illustrate valve assembly 18. FIGS. 1A and 1B illustrate Applicant's novel valve assembly 18 in an open condition (cool water flow through slide ports 808E illustrated by arrows) and with the override locked out or disengaged. In the condition illustrated in FIGS. 1A and 1B, an increase in water temperature above a predetermined level will cause piston 814 to move to the right as indicated in FIG. 2A, the piston moving within slide 808, so as to shut off fluid flow through slide ports 808E when piston head 814A has moved far enough, that is, to the position as illustrated in FIG. 2A.

Figure 2A:
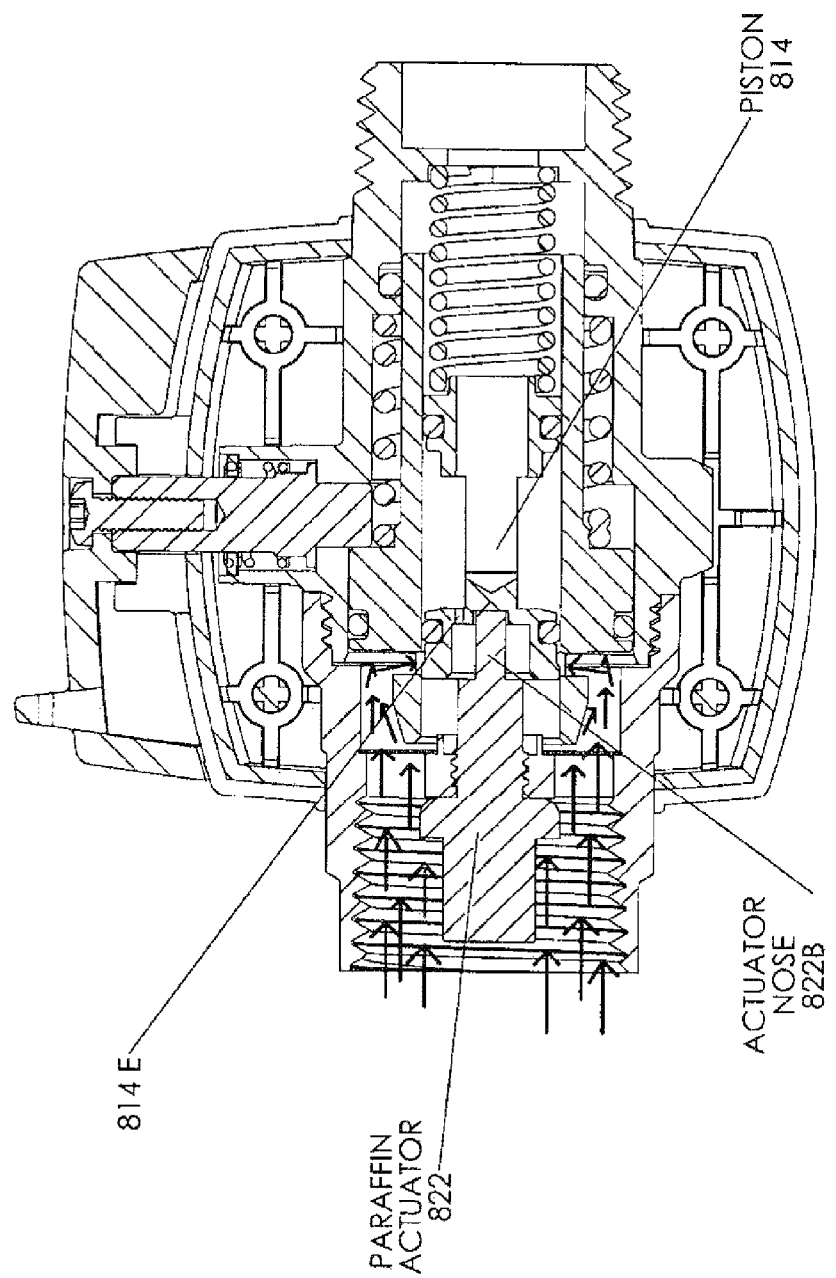
FIG. 2A is a top sectional elevational view of the valve assembly showing with arrows the water flow.
Figure 2B:
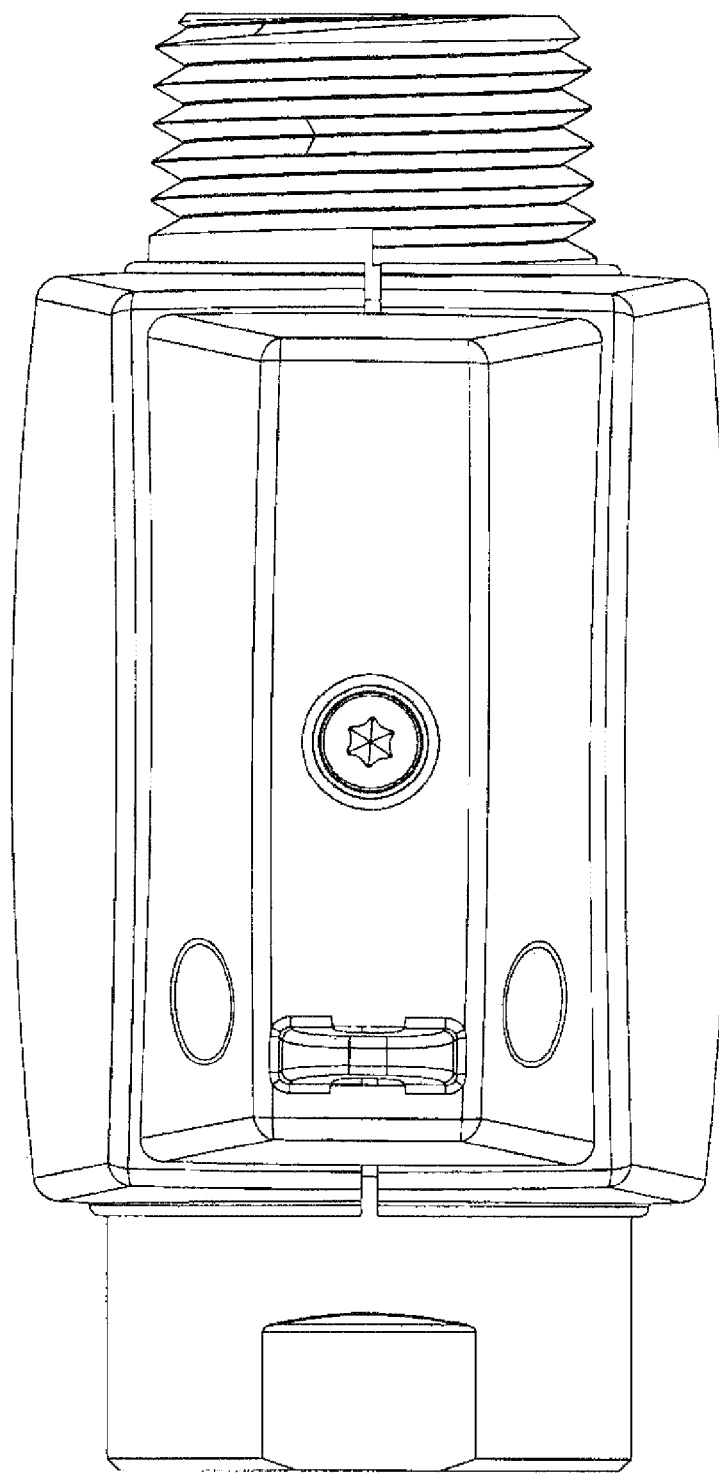
FIG. 2B is an external side elevational view of the valve assembly.

Left in the condition as illustrated in FIG. 2A, that is, with override locked out or disengaged, the only way water will resume flow is subsequent cooling (allowing hose to retract) which will allow piston spring 812 to move piston 814 and uncover slide ports 808E, allowing flow to resume through the hollow section of slide body 808D and piston 814, and out through outlet port 802A and body rear 802.

Figure 3A:
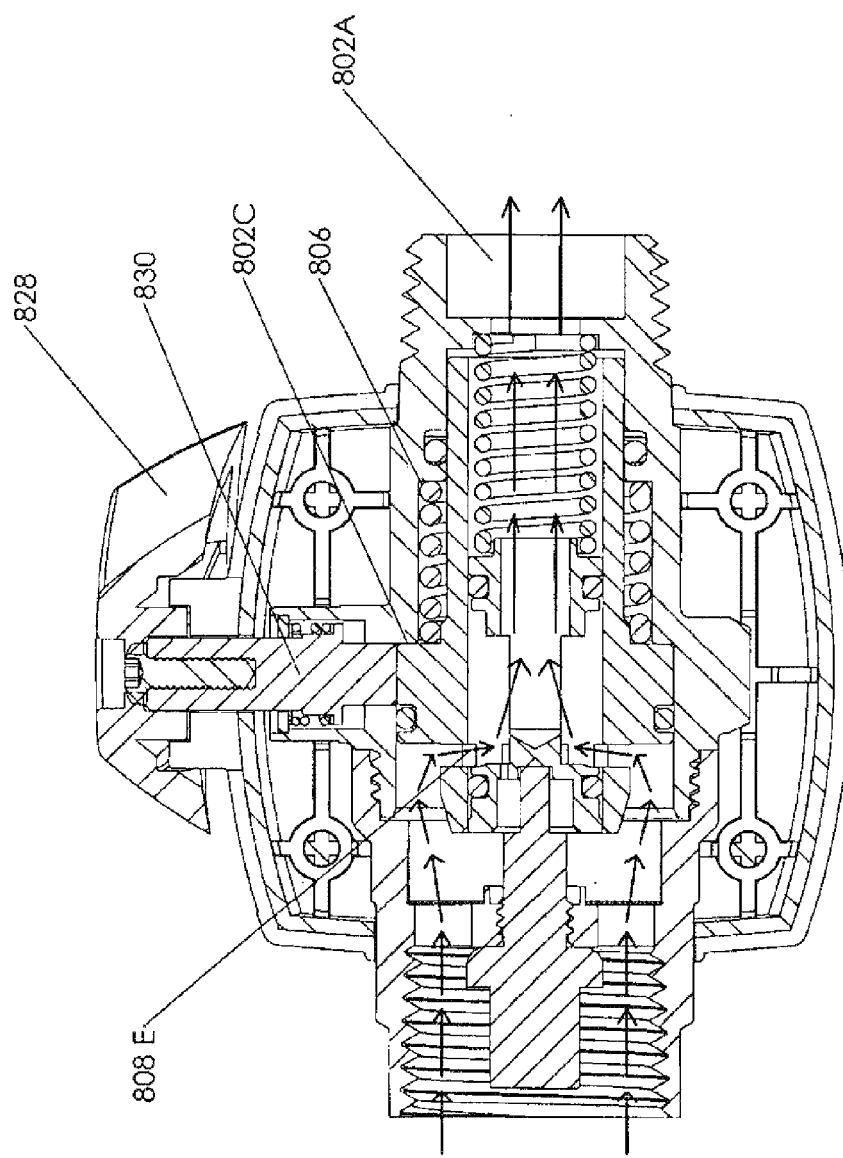
FIG. 3A is a sectional top elevational view of the valve assembly showing with arrows the water flow.
Figure 4:
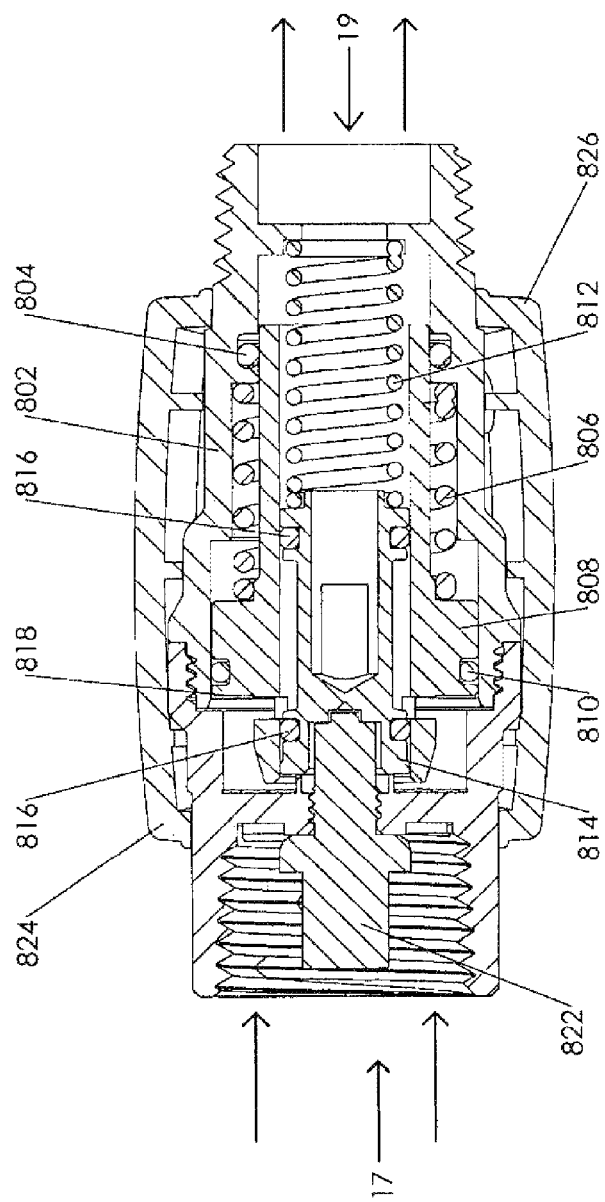
FIG. 4 is a sectional elevation side view of the valve assembly.

FIGS. 3A and 3B illustrate the novel valve assembly 18 after the user has elected to manually rotate handle 828, so as to withdraw release pin 830 from the rear of slide head 808B. Upon movement of the handle as seen in FIGS. 3A and 3B, the movement of slide 808 under the impetus of water pressure upstream of slide head 808B will overcome the pressure exerted by slide spring 806 and move the slide downstream and against annular stop lip 802C in body rear 802. This movement will uncover slide ports 808E and allow water (as well as water above the cutoff temperature) to resume flow through hollow sections of piston 814 and slide 808 and out outlet port 802A.

The user can adjust the water mix to the desired temperature above or below the cutoff temperature when in the bypass engaged condition illustrated in FIGS. 3A and 3B. When the user is through with showering, the user will simply shut off the mixing valves which are typically upstream of valve assembly 18. At this point (no/low water flow), slide spring 806 will allow slide 808 to move to the left or "upstream." When slide head 808B abuts shoulder 820A, release pin 830 under the impetus of release pin spring 832 will move to the lockout position as illustrated in FIGS. 1A and 1B, thus automatically resetting the override to a pre-override position. While the drop in hydraulic pressure allows the slide to move up to the pre-override position, other mechanical or electrical means may be used to achieve this function, including direct mechanical engagement with the mixing valves or position/pressure sensors combined with actuators to move the slide.

Figure 5:
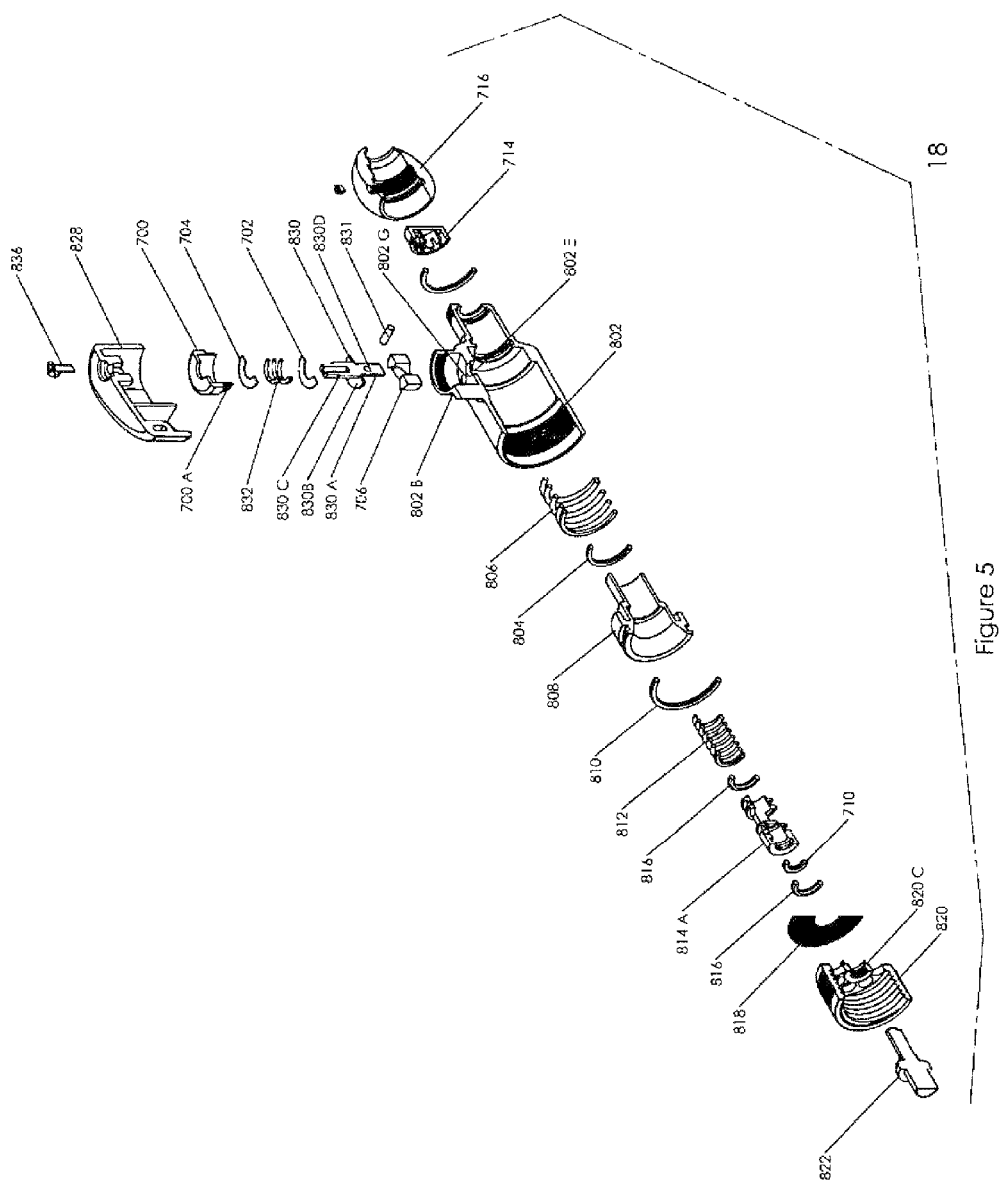
FIG. 5 is an exploded view of an alternate preferred embodiment of the valve assembly with some additional and/or different features not illustrated in the previous drawings.
Figure 5A:
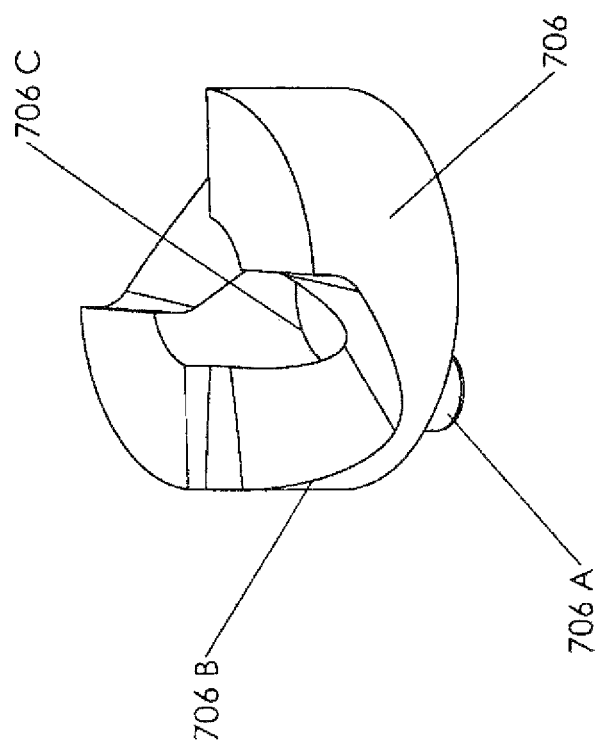
FIG. 5A is a perspective view of the cam used with the valve assembly.
Figure 5B:
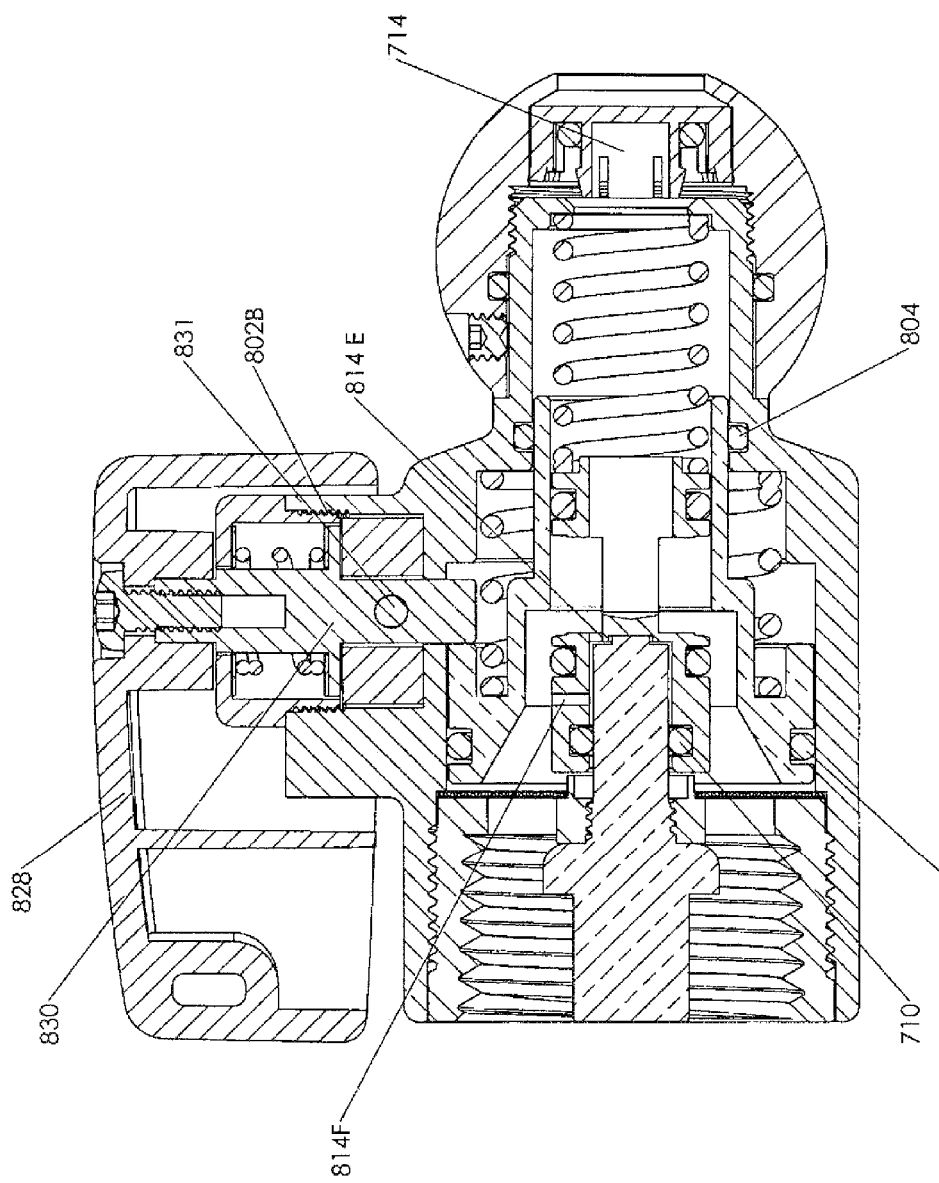
FIG. 5B is a sectional top elevational view of the valve assembly showing the override assembly in lockout or disengaged position.

FIGS. 5 and 5B illustrate an additional embodiment of the device as set forth herein which has some additional and/or different features. Further, FIG. 5, given that it is a cross-sectional perspective view, will help further illustrate the structure of some of the elements of the invention shown in the earlier Figures.

FIG. 5 illustrates the manner in which body front 820 includes threaded walls 820C, which allow secure engagement with actuator 822. Screen 818 may be sandwiched between body 820 and main body rear 802 to provide for filtering of water passing through the valve assembly.

Figure 5C:
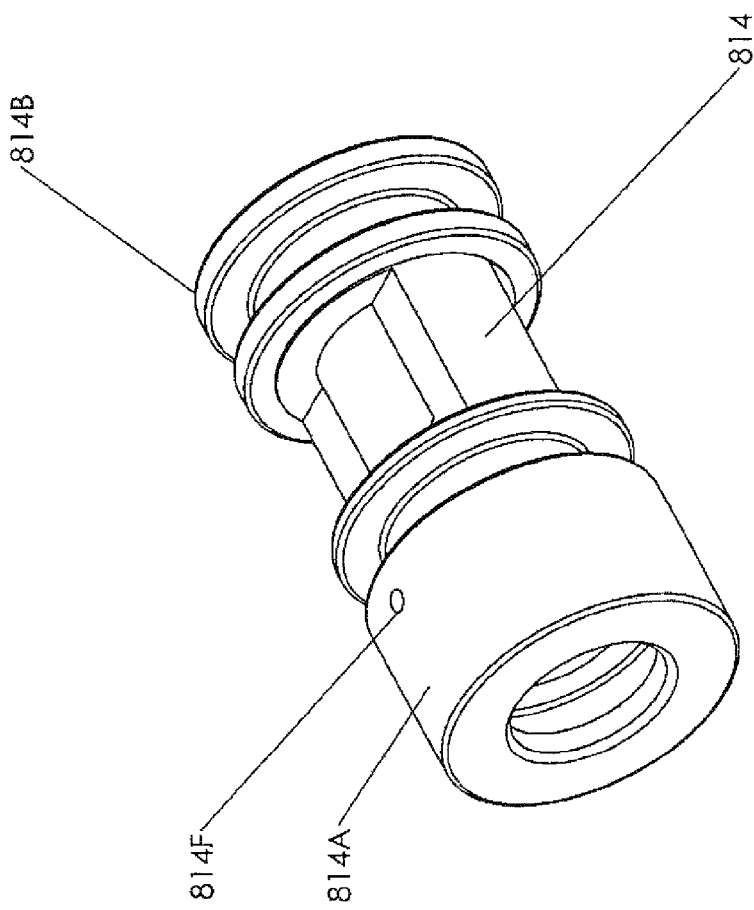
FIG. 5C is a perspective view of the piston used with the valve assembly.

Whereas, FIG. 1 illustrates a pair of O-rings 816 fitted by compression to grooves in outer walls of piston 814, it is seen with respect to FIGS. 5 and 5C that a piston gland O-ring 710 may be provided fitable to a groove on the inner walls of piston head 814A. Gland O-ring 710 will make contact with the actuator nose 822B as seen in FIG. 5B.

Thus, it is seen the embodiment illustrated in FIGS. 5 and 5C has a piston with three O-rings, two on the outside and one gland O-ring on the inside to contact the actuator. The two on the outside will be maintained in their groove under compression and will contact the inner walls of the slide as seen in FIGS. 1, 1A, and 5B, for example.

The use of the gland O-ring 710 is to help seal off water, the use of the three O-rings, including the ones at the ends of the piston, will help provide a "cushion" and a "drag" that will provide dampening and thus help reduce the likelihood from "hammering" that may occur.

Details of a release assembly, whose function it is to release slide 808 and therefore activate the bypass or override function as seen in FIGS. 3A and 3B are seen to include: handle screw 836 for engaging handle 828 and extending therethrough to engage release pin threaded portion 830C of release pin 830. Pin cylinder cap 700, having cap threaded area 700A, screws into a threaded area on release pin housing 802B of body rear 802. With this, it can be seen that the release pin spring 832 will act on release pin land 830B. Thus, in the valve assembly, a release pin actuated by a handle, the release pin having cam pin 831, will always urge release pin 830 towards an engaged or interference position as illustrated in FIGS. 5 and 5B. It is seen that release pin 830 has a hole 830D in release pin arm 830A to receive cam pin 831 (shown in FIG. 5B) and would be perpendicular to release pin arm 830A and extend through the hole 830B. As seen in FIGS. 5 and 5A, cam 706 is insertable into release pin housing 802B and has boss 706A that will seat into the hole 802G slots in the base of release pin housing 802B. Central opening 706C in cam 706 is dimensioned to allow arm 830A to extend through the cam and through opening 802E in the base of release pin housing 820B, so as to be capable of reaching the position which locks out the override (FIGS. 1A, 2A, and 5B).

FIGS. 5, 5A, and 5B also illustrate curved portion 706B of cam 706, which allows cam pin 831 to ride up the curved portion against pressure of release pin spring 832 when the handle is rotated. Riding up from the position seen in FIG. 5B will allow release pin arm 830A to withdraw from the interference or lockout position, and "release" to allow the override or bypass to engage. Note that even in position with the override engaged (FIG. 3A), release spring 832 is urging release pin arm against the outside walls of slide head 808B, so as soon as the slide moves forward (responsive to the mixing valves being shut off, for example), the release pin arm 830A will automatically engage the rear of the slide head 808B (FIGS. 1A, 2A, and 5B) to lock out the override.

FIG. 5B illustrates an embodiment of piston 814 with two small channels 814E and 814F in piston head 814A that will allow water, to trickle through the valve even when it is in an off position. This will help prevent cross-flow on worn mixing valves and acts as a hydraulic dampener to prevent "hammering." It is seen from FIG. 5B that, if the piston moved to a port flow blocking position, channels 814E and 814F would provide for the trickle flow of water through the valves. Further, the effect of gland O-ring 710 against the actuator nose combined with the two small channels 814E and 814F provides a "piston pump" hydraulic action to help prevent by dampening to potential hammering. The piston base 814B helps stabilize the piston in the slide and also helps prevent hammering.

FIG. 5 also illustrates the use of a flaw restrictor 714 here designed to limit the flow to about 2.5 gallons per minute under typical pressures, as may be found in valves when the mixing valves are open and the valve is allowing water to flow therethrough. The position of the flow restrictor is typically downstream of the main body and the control elements of the valve.

FIG. 5 is also seen to include a ball 716 for engagement with main body rear 802 with, for example, the use of threads. Ball 716 will allow rotation with elements downstream thereof, for example, as set forth in FIG. 5B.

Figure 6:
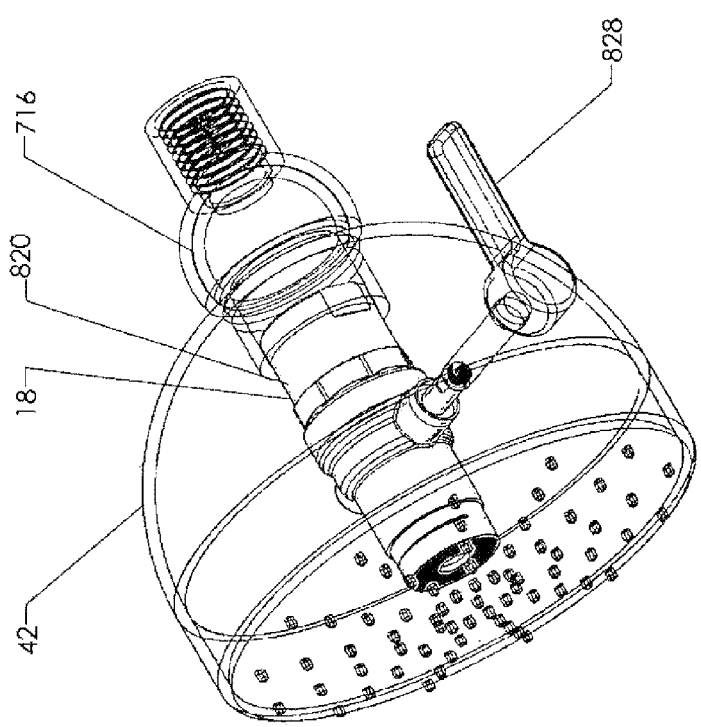
FIG. 6 is an elevational view of the valve assembly integrated with a showerhead.

FIG. 6 shows valve assembly 18 with ball 716 on the upstream end and attached to body front 820 by threadable means. Thus, ball 716 may be utilized on either the upstream or downstream end of the body.

FIG. 6 also illustrates the use of the valve inside a custom showerhead 42. In this embodiment, housing parts 824/826 may be omitted. The valve, except the handle, may be enclosed within the body of the showerhead, forming an integrated showerhead/valve unit.

Figure 7:
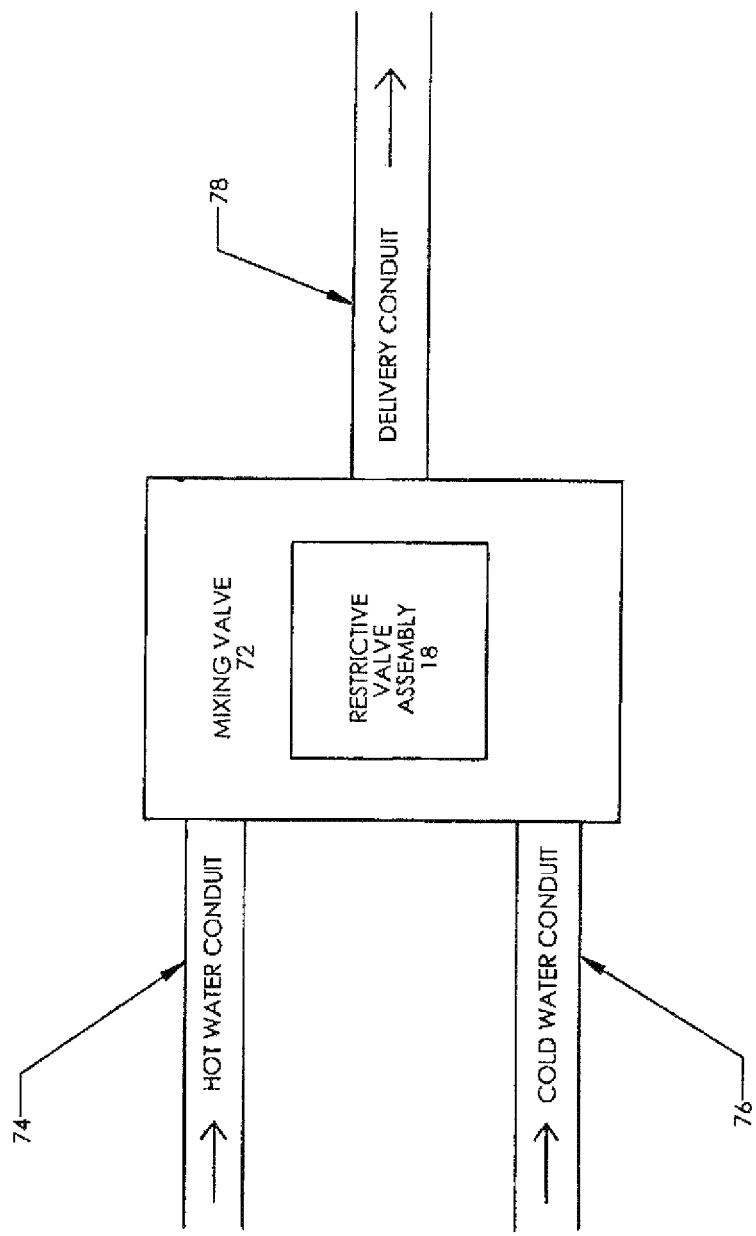
FIG. 7 is an illustration of Applicants' valve assembly integrated with a mixing valve or valves.
Figure 8:
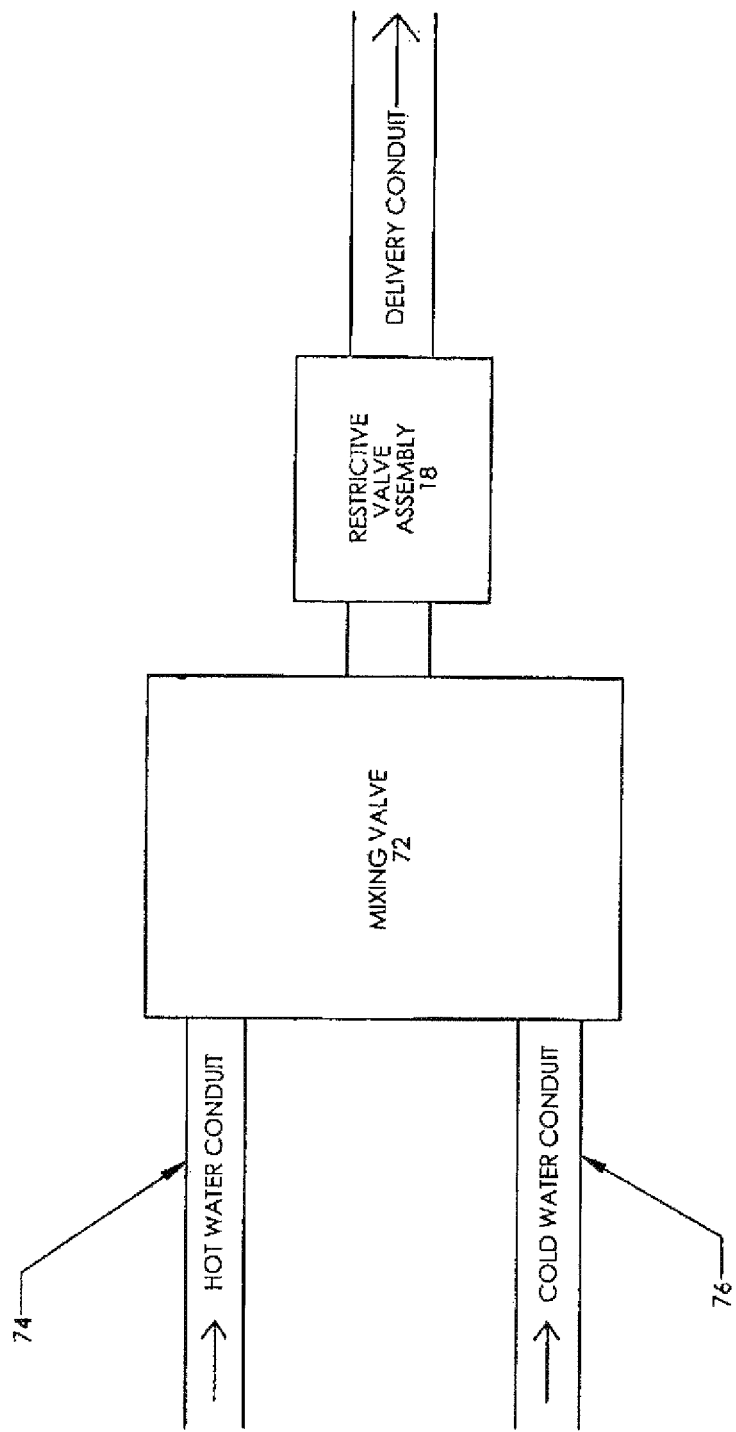
FIG. 8 is an illustration showing the use of Applicants' valve assembly downstream of mixing valves.

FIGS. 7 and 8 illustrate the use of Applicants' novel valve assembly 18 in a larger environment as part of a water flow control system. FIG. 7 illustrates that the novel valve assembly 18 may be physically incorporated into the same housing as the mixing valves or valves 72. Mixing valve 72 would typically receive water from a hot water conduit 74 and a cold water conduit 76. Integrated within the same assembly housing as mixing valves which control the amount of hot and cold water coming into a single delivery conduit 78, may be the restrictive valve assembly 18.

On the other hand, as seen in FIG. 8, Applicants' valve assembly 18 may be downstream from mixing valve 72 and in line with a delivery conduit 78. In FIG. 8, it is seen that valve assembly 18 is downstream of a mixing valve and upstream of a showerhead (not shown).

Figure 8A:
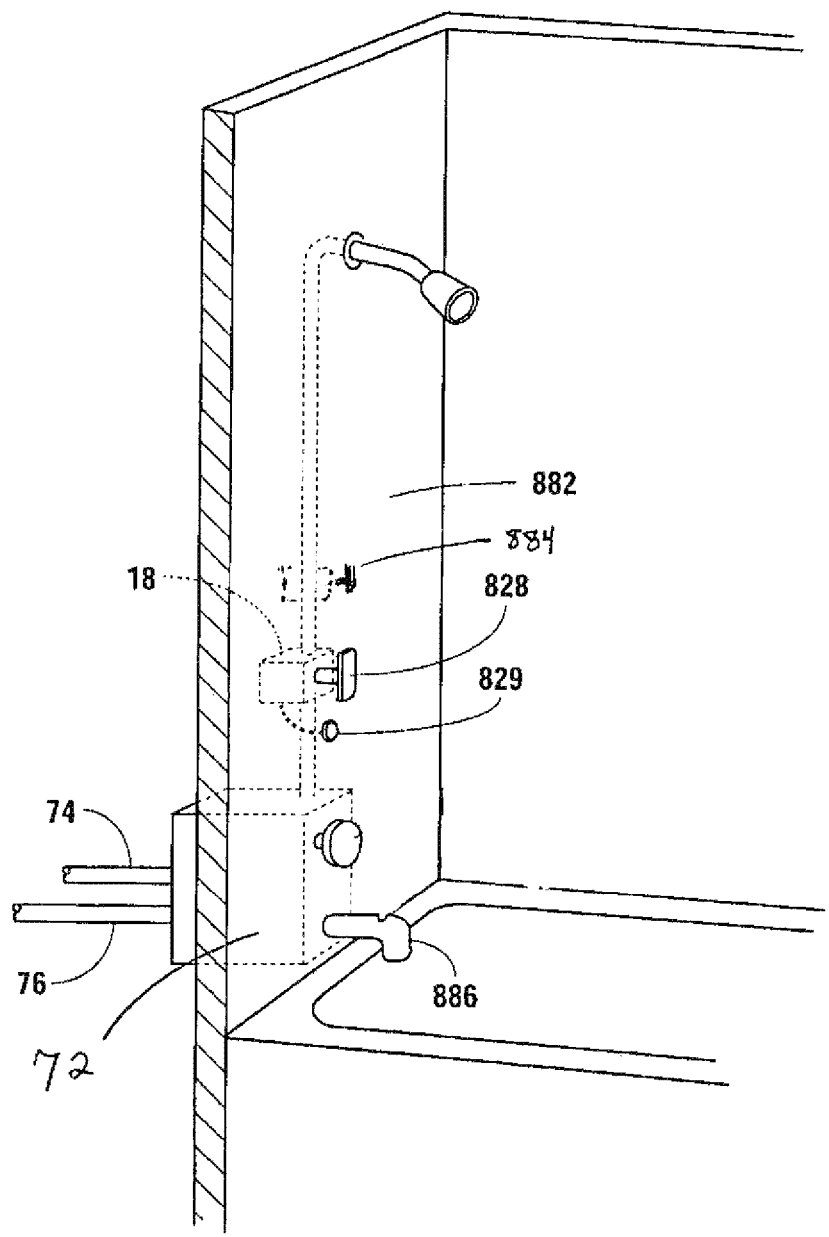
FIG. 8A is an illustration of Applicants' valve assembly as part of a larger flow control system including a wall.

FIG. 8A illustrates Applicants' novel valve assembly 18 in a larger environment as part of a water flow control system. FIG. 8A illustrates that Applicants may provide a wall 882 to substantially isolate, from the user and the environment in which the user will bathe, elements including mixing valve 72 excepting handle, which would be exposed through wall 882 for manual manipulation by the user. Mixing valve or valves 72 are known in the art for receiving water from cold, water conduit 76 and hot water conduit 74. Applicants' water flow control system may include a diverter valve 884 downstream, typically, of valve assembly 18 to, for example, divert water from a showerhead flow or a tub faucet flow.

The embodiments illustrated (see, for example, FIGS. 1 and 5), show that Applicants' temperature sensing mechanism, for example, actuator 822, is advantageously, but not necessarily, placed in the most upstream position so a to better respond to temperature changes and avoid the heat sink effect of elements downstream of the actuator. Further, it is seen that Applicants' sensor is pushing the piston in a downstream direction as it expands, that is, pushing in a direction that is assisted by the water pressure, moving the piston, as illustrated in the drawings from left to right. Actuator 822 is, in one embodiment, a wax actuator adapted to respond by expanding in a range of approximately 90° F. to 110° F., such as an actuator manufactured by Vernet as Model Nos. A034 and A092/P. Element 822 both senses temperature changes and responds, as by expanding or contracting to such change. The sensing and actuating functions may be achieved through separate elements however. Other temperature actuators/sensors, such as a temperature responsive memory wire, a bimetallic element, or other known and appropriate temperature responsive phase change materials, or electromechanically operated temperature sensors may be used in conjunction with Applicants' novel valve assembly, such as those known in the art.

As seen with reference to the Figures, the slide will typically have an upstream slide head area that is responsive to water pressure in urging the slide to a downstream direction. Likewise, the piston typically would have an area exposed to water pressure upstream that would tend to move it to a downstream position. In Applicants' novel valve, such area on the slide here seen to be an annular ring, is significantly larger than the piston head area.

While the grasping member to the release of the override feature is illustrated to be a handle, the override feature may be actuated with a lanyard, chain, electronic button, switch and optical or other sensor. Moreover, a visual/audible indicator 829 (see FIG. 8A) may be used to indicate that the shower is ready (that is, when the temperature actuator has restricted the flow of water). Indeed, a visual or audible "reminder" may be used, including a popout indicator or a constant or blinking light. Temperature or pressure actuated visible or audio indicators may also be used.

FIGS. 1 and 5B illustrate the use of a gland O-ring 804 situated and engaged with the body walls near the downstream end of slide 808 when the slide is in its upstream most position. O-ring 810 is seen to engage the slide head. The use of a gland O-ring will "swipe" the slide along with its position at the downstream end of the slide helps, among other things, decrease mineral deposits buildup on the slide. O-ring 810 will swipe the channel walls of the body when the slide moves. The use of the O-rings in these positions helps prevent drying out which tends to create scale and scale tends to impede the proper effective operation of the elements. Between these O-rings, a lubricant, such as a silicon based lubricant, is provided to keep the channel and slide walls lubricated.

As is illustrated, Applicants' novel valve may be located in between the shower arm and the showerhead using matching threads. It may also be incorporated into the showerhead. Applicants' novel valve assembly may be retrofitable to many shower arms by removing existing threaded showerheads and inserting in the space between the showerhead and the end of the shower arm, Applicants' novel valve and threading the showerhead to the downstream end after threading the valve into the end of the threaded end of the shower arm. The valve may also be built into the shower arm or shower stall/tub walls (see FIG. 8A).

Although the invention has been described with reference to specific embodiments, this description is not meant to be construed in a limited sense. Various modifications of the disclosed embodiments, as well as alternative embodiments of the inventions, will become apparent to persons skilled in the art upon the reference to the description of the invention. It is, therefore, contemplated that the appended claims will cover such modifications that fall within the scope of the invention.

The invention claimed is:

1. A valve for controlling a flow of water, the valve comprising:
   a main body including a channel extending through the main body, the channel configured to receive water at an inlet port and pass water to an outlet port; and
   a flow control assembly in operative engagement with the channel, the flow control assembly including:
      a temperature sensor configured to sense a temperature of water flowing through the channel;
      a flow control member configured to control a flow of water then channel responsive to the temperature sensor, the flow control member movable between a first position and a second position, where in when the flow control member is in the first position the flow control member is configured to allow the flow of water through the channel as function of the temperature sensor, where in when the flow control member is in the second position water is restricted from flowing in the channel; and
   a member configured to be securely set to allow water to flow in the channel regardless of the temperature of water flowing through the channel.

\* \* \* \* \*